Figure 1:
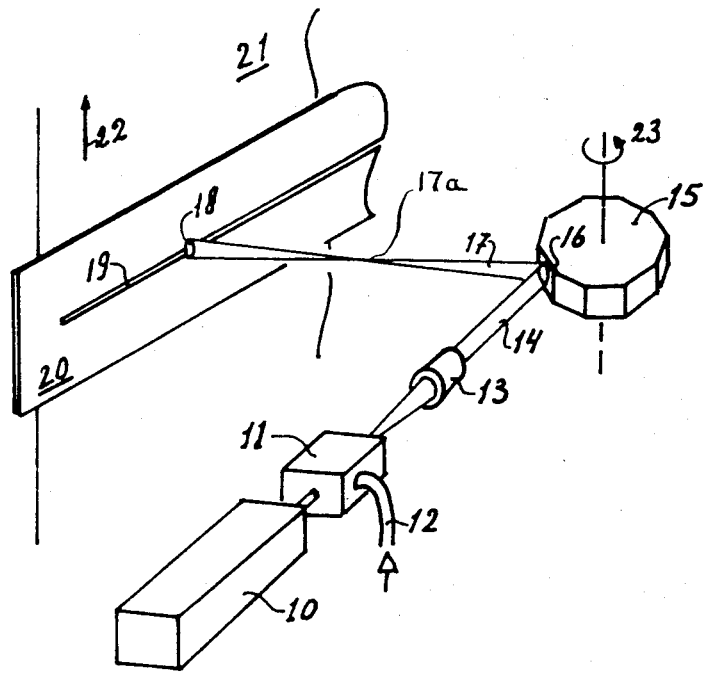

United States Patent [19]

Rongen et al.

[11] Patent Number: 4,641,950
[45] Date of Patent: Feb. 10, 1987

[54] EXPOSURE SYSTEM

[75] Inventors: Josephus W. Rongen, Venlo; Robertus van Cooten, Grubbenvorst, both of Netherlands

[73] Assignee: Océ-Nederland B. V., Venlo, Netherlands

[21] Appl. No.: 655,747

[22] Filed: Oct. 1, 1984

[30] Foreign Application Priority Data

Oct. 10, 1983 [NL] Netherlands ............ 8303470

[51] Int. Cl.⁴ .............................. G03G 15/04
[52] U.S. Cl. .................... 355/3 R; 355/67; 355/71
[58] Field of Search ............. 355/3 R, 71, 67

[56] References Cited

U.S. PATENT DOCUMENTS

| | | | |
|---|---|---|---|
| 3,441,668 | 4/1969 | Townsend | 178/7.2 |
| 3,995,110 | 11/1976 | Starkweather | 178/7.6 |
| 4,305,650 | 12/1981 | Knox | 355/71 X |
| 4,355,891 | 10/1982 | Cole et al. | 355/71 X |
| 4,469,430 | 9/1984 | Terashima | 355/3 R |

FOREIGN PATENT DOCUMENTS 0011003 5/1980 European Pat. Off. .
1303657 1/1973 United Kingdom .

Primary Examiner—Fred L. Braun
Attorney, Agent, or Firm—Albert C. Johnston

[57] ABSTRACT

An exposure system for imagewise exposure of a movable light-sensitive layer, dot by dot along a line on the layer, to an electronically modulated light beam such as that of a laser has a narrow slit disposed near the light-sensitive layer in the path of the light beam, the slit being made with a width less than the dimension at the slit of the light beam in the direction of slit width. In this simple way, the laser beam always describes at least one and the same imaging line relative to the light-sensitive layer, even when beam run-out occurs.

9 Claims, 2 Drawing Figures

EXPOSURE SYSTEM

This invention relates to a system for imagewise exposure of a movable light-sensitive layer dot by dot along a line on the light-sensitive layer, which system is of the kind that comprises at least one light source and means for modulating each beam of light with electronic information.

U.S. Pat. No. 3,995,110 describes an exposure system of that kind, known as a laser printer, in which a laser emits a beam of light that is modulated with supplied electronic information and then is projected via a lens system onto a rotating polygonal mirror each facet of which can deflect the beam to a moving light-sensitive layer. By rotation of the mirror and simultaneous modulation of the laser beam the beam writes dot by dot along a line on the light-sensitive layer. By conveying the light-sensitive layer perpendicularly to the scanning direction a complete image can be built up dot-wise.

The individual surfaces, or facets, of a polygonal mirror always have some inaccuracies, minute though they may be, and will therefore occupy slightly different angles relative to the axis of rotation. As a result, the deflected beam will not always meet the light-sensitive layer at exactly one and the same imaginary line. The attendant deviation from a desired imaging line is termed "run-out."

According to the above-mentioned U.S. patent, the run-out is reduced by disposing a semi-cylindrical lens in the path of the laser beam between the polygonal mirror and the light-sensitive layer. The resulting apparatus, however, still has some disadvantages. For example, although the use of a semi-cylindrical lens reduces the beam run-out, some objectionable run-out still will always be present. Also an optimum compromise has to be found between image focussing and minimum run-out in respect of the positioning of the lens, and extensive, time-consuming adjustment procedures are required for this purpose.

The principal object of the present invention is to provide an exposure system by which the above mentioned and other disadvantages of the known exposure system are obviated.

According to this invention, in an exposure system in which a movable light-sensitive layer is exposed dot by dot along a line thereon to at least one beam of light, each beam being issued from a light source and modulated with electronic information, a slit is disposed between each light source and the light-sensitive layer near and parallel to the required line of exposure on the light-sensitive layer, and the slit width is made less than the dimension at the slit of the beam of light in the direction of the slit width.

By employing a narrow exposure slit in this way, a simple solution is provided for the problem of beam run-out in that a beam of light will always describe at least one and the same line for exposure of the light-sensitive layer, even when run-out occurs. Further, the requirements in respect of focusing the light beam are also reduced by employing a narrow slit in this way.

Figure 2:
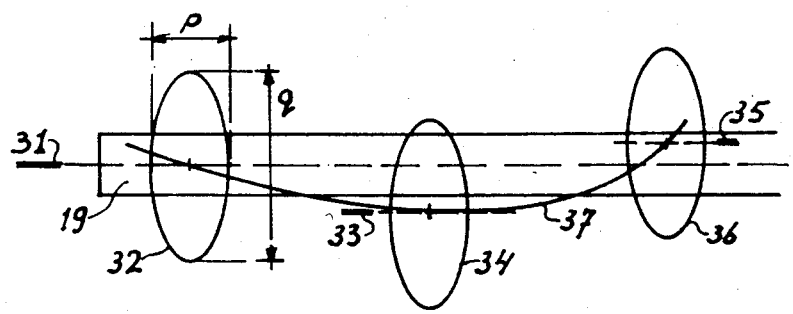

Other features and advantages of the invention will be apparent from the following description in which reference is made to the accompanying drawings. In the drawings: FIG. 1 is a schematic representation of an exposure system embodying the invention; and FIG. 2 schematically illustrates a portion of the exposure slit of the system of FIG. 1 in relation to differently deflected light beams.

As represented schematically in FIG. 1, in the illustrated embodiment of an exposure system according to the invention a laser light source 10 delivers a monochromatic beam of parallel light which in modulator 11 is modulated with video information fed via line 12. The resulting modulated beam is projected via lens system 13, in the form of a beam 14, onto a reflecting surface 16 of a polygon 15 which is rotated in the direction of arrow 23 so that the reflected beam 17 will impinge on the light-sensitive layer 21 and will traverse a line extending across layer 21 in perpendicular relation to the direction 22 of movement of the layer.

The light-sensitive layer 21 is an electrophotographic layer that has been charged electrostatically so that imagewise exposure of it to light of the beam 17 will produce a charge image developable in known manner with toner.

A plate 20 provided with a narrow light-transmitting slit 19 is disposed near and parallel to the light-sensitive layer 21, at a location between the polygonal mirror 15 and the light-sensitive layer 21. The slit 19 is made, for example, with a width of 80 micrometers, but a slit of a different width, though preferably of less than 150 $\mu$m, can also be used.

The light beam 14 as deflected into beam 17 by mirror facet 16 is focussed by means of a lens system 13 so that the beam converges to a focal point 17a located in front of the slit 19, and then diverges beyond the focal point. A light spot 18 thus formed on the slit 19 is larger, at least in the direction of the slit width, than the width of the slit 19. The size of the light spot 18 at slit 19 can be varied by varying the location of the focal point of beam 17. As the mirror 15 rotates in the direction of arrow 23, the light spot 18 will move from right to left over slit 19 as viewed in FIG. 1 and thus will expose the light-sensitive layer 21 dot by dot along one line in accordance with the video information fed via the signal input line 12.

If the beam 17 would have to be focused accurately to a spot on the light-sensitive layer 21, as in the system of U.S. Pat. No. 3,995,110, this condition could be met only approximately, because the distance between the reflecting surface 16 of mirror 15 and the middle of the light-sensitive layer 21 differs from the distance between the reflecting surface 16 and the side edges of layer 21. In such a system, a small light spot formed by focusing the beam onto the middle of the light-sensitive layer 21 will become increasingly larger upon movement of the beam toward the side edges.

In contrast, in the exposure system according to the present invention, the area of the light-sensitive layer exposed by the beam always remains constant as a result of providing the width-restricting slit in the path of a light beam which at the slit location is larger than the slit in the direction of the slit width.

A detail of a portion of the slit 19 in relation to varying positions of the light beam is illustrated schematically in FIG. 2. Line 31 denotes the center of the slit 19, the width of which is, for example, 80 micrometers. The beam 17 can form at the face of plate 20, so at the slit 19, for example, a light spot 32 the center of which coincides exactly with the center line of the slit 19. If run-out occurs, the center of the light beam will no longer coincide exactly with line 31 but will lie, for example, on a lower line 33; yet the associated light spot 34 still covers the complete width of slit 19. Similarly, a light spot 36 having its associated center line 35 lying above center line 31 will also cover the slit width completely. Thus, the light spots, or dots, which reach the light-sensitive layer beyond the slit have a very high degree of linearity which is not affected by run-out of the beam. In the absence of the slit 19 there would be variations in linearity as indicated, for example, by the projection line 37 connecting the centers of the light spots 32, 34 and 36.

The beams projected on the slit can have any form, provided that the dimension of each beam at the slit in the direction of the slit width is larger than the width of the slit. Preferably, beams of oval shape are used, as illustrated in FIG. 2. Such oval beams can be formed, for example, by modulating the laser beam with a suitably arranged acousto-optic modulator. The beam of light is preferably so formed and focused that the width p of the light spot at the slit 19 corresponds to the width of the slit 19, while the length q of the light spot corresponds to two to three times the width of the slit. In this way, for example, dots of 80×80 micrometers in size are written, while run-out errors of about 100 micrometers can be compensated.

The invention can be embodied in other forms of apparatus, without restriction to particulars of the embodiment here illustrated and described. For example, the narrow slit can also be used in an exposure system making use of one or more LED arrays which are imaged on a light-sensitive layer by one or more lenses. A system of this kind, as described in U.S. Pat. No. 4,107,687, comprises a large number of arrays, each composed of five LED's, with one lens provided per array to focus the beams of light from the five LED's onto the light-sensitive layer. All these arrays and lenses must be arranged so that one straight line is exposed dot-wise on the light-sensitive layer. Accordingly, extensive adjustments are required in order to achieve the required linearity.

By disposing a narrow slit between the lenses and the light-sensitive layer and making the beams of light incident on the slit larger than the width of the slit, in accordance with the present invention, the requirements in respect of alignment of the arrays and lenses are greatly reduced. The beams incident on the slit can be made larger than the width of the slit, for example, by adapting the geometry of the light sources, for instance by employing elongate LED's. This condition can also be met in a simple manner by locating the lenses so that focusing takes place at a location between them and the slit.

Another embodiment of an exposure system acording to the invention is obtained with use of a cathode-ray tube (CRT) as the light source. In such a case, a linewindow is excited dot-wise, according to the desired image, on a cathode-ray tube. The dots formed are imaged via a lens or via fiber optics onto a light-sensitive layer in substantially direct contact. The excited dots of the cathode-ray tube are fairly large, and this restricts the resolution of the exposure system. The use of a narrow slit in front of the light-sensitive layer increases the resolution in this case also.

If in such a system more cathode-ray tubes are used side by side in order to increase the print width, complex problems arise in connection with alignment of the system, for all the CRT's must image their image forming lines along one straight line on the light-sensitive layer. The use of a slit as herein disclosed in combination with the relatively large light beams of the cathode-ray tube will make this alignment less critical.

We claim:

1. In an exposure system for imagewise exposing a movable light-sensitive layer to at least one beam of light dot by dot along a line on said layer, including at least one light source, each for generating a beam of light, and means for modulating each said beam with electronic information, and wherein at least one said beam so modulated is subject to substantial deviation of its location perpendicularly relative to said line of exposure, the combination which comprises means disposed across the path of said modulated beam for blocking passage to said light-sensitive layer of portions of said modulated beam deviated perpendicularly away from said line of exposure and within said blocking means a narrow light transmitting slit extending parallel to said line of exposure, the width of said slit being less than 150 $\mu$m and so much less than the dimension at the slit of said modulated beam in the direction of the slit width that said slit passes to said layer only limited portions of said modulated beam which are substantially centered on said line.

2. An exposure system according to claim 1, said at least one light source being a laser.

3. An exposure system according to claim 1, each said light source being a cathode-ray tube.

4. An exposure system according to claim 1, each said light source being a LED array.

5. An exposure system according to claim 1, 2, 3, or 4, said slit width being of the order of about 80 $\mu$m.

6. An exposure system according to claim 1, said at least one light source being a laser, said system further including a polygonal mirror rotatable to scan said light-sensitive layer dot by dot along a line thereacross with a beam derived from said laser and a lens system between said modulating means and said mirror for projecting a modulated laser beam onto said mirror and thence in part through said slit to said layer, said modulating means and said lens system being operative to form a modulated laser beam focused at a location intermediate said slit and said mirror so that a modulated laser beam divergent in the direction of the slit width is incident on said slit.

7. An exposure system according to claim 6, said divergent beam having at said slit a dimension in the direction of the slit width of about two to three times the width of said slit.

8. An exposure system according to claim 7, the dimension of said divergent beam in the longitudinal direction of the slit being approximately equal to the slit width, whereby approximately equilateral spots of the beam light are passed to said light-sensitive layer.

9. An exposure system according to claim 6, 7, or 8, said slit width being of the order of about 80 $\mu$m.

* * * * *